(12) United States Patent
Thomas

(10) Patent No.: US 8,922,896 B2
(45) Date of Patent: Dec. 30, 2014

(54) OPTICAL IMAGING DEVICE

(71) Applicant: Cairn Research Limited, Faversham (GB)

(72) Inventor: Martin Thomas, Faversham (GB)

(73) Assignee: Cairn Research Limited, Faversham (GB)

( * ) Notice: Subject to any disclaimer, the term of this patent is extended or adjusted under 35 U.S.C. 154(b) by 0 days.

(21) Appl. No.: 14/077,595

(22) Filed: Nov. 12, 2013

(65) Prior Publication Data

US 2014/0133034 A1     May 15, 2014

(30) Foreign Application Priority Data

Nov. 13, 2012 (GB) .................................. 1220422.8
May 22, 2013 (GB) .................................. 1309229.1

(51) Int. Cl.
*G02B 27/14* (2006.01)
*G02B 21/36* (2006.01)
*G02B 27/10* (2006.01)

(52) U.S. Cl.
CPC .......... *G02B 21/367* (2013.01); *G02B 27/1066* (2013.01); *G02B 27/144* (2013.01)
USPC ....................................................... 359/629

(58) Field of Classification Search
USPC ........ 359/629, 639, 583, 210.2, 212.2, 220.1, 359/223.1, 302; 356/45, 300, 390; 348/335, 348/336
See application file for complete search history.

(56) References Cited

U.S. PATENT DOCUMENTS

| | | |
|---|---|---|
| 4,864,390 A | 9/1989 | McKechnie et al. |
| 7,667,761 B2 * | 2/2010 | Thomas ........................ 348/335 |
| 2004/0001525 A1 | 1/2004 | Yano et al. |
| 2009/0059363 A1 | 3/2009 | Straehle et al. |

FOREIGN PATENT DOCUMENTS

| | | |
|---|---|---|
| DE | 102009060490 A1 | 6/2011 |
| EP | 0933929 A1 | 8/1999 |
| EP | 1615009 A1 | 1/2006 |
| GB | 257547 A | 9/1926 |
| GB | 257548 A | 9/1926 |
| GB | 2442576 A | 4/2008 |
| WO | WO 2011/032028 A2 | 3/2011 |

OTHER PUBLICATIONS

Search Report issued in connection with United Kingdom Patent Application No. GB1220422.8, United Kingdom Intellectual Property Office, 2 pages, Feb. 26, 2013.

(Continued)

*Primary Examiner* — Tuyen Tra
(74) *Attorney, Agent, or Firm* — DASCENZO Intellectual Property Law, P.C.

(57) ABSTRACT

There is provided an optical imaging device for splitting an initial image into images with different optical characteristics, wherein the device comprises a plurality of beamsplitters and at least first and second reflectors arranged to create multiple images adjustably separable in two orthogonal directions, characterised in that the first reflector is rotatable about a first axis and the second reflector is rotatable about a second axis, the second axis orthogonal to the first axis. The beamsplitters are located in a first optical layer to create multiple optical pathways directed substantially orthogonally from the first optical layer to a second spaced apart optical layer. Each reflector can be moved translationally relative to its rotational axis.

15 Claims, 4 Drawing Sheets

(56) References Cited

OTHER PUBLICATIONS

English-language abstract of German Patent Application No. DE 102009060490 A1, Jun. 30, 2011.

Search Report issued in connection with European Patent Application No. EP 13 19 0524, European Patent Office, 1 page, Feb. 5, 2014.
Search Report issued in connection with United Kingdom Patent Application No. GB1309229.1, United Kingdom Intellectual Property Office, 1 page, Nov. 22, 2013.

* cited by examiner

OPTICAL IMAGING DEVICE

RELATED APPLICATIONS

The present application claims priority to United Kingdom Patent Application No. 1309229.1, filed on May 22, 2013, and United Kingdom Patent Application No. 1220422.8, filed on Nov. 13, 2012, the complete disclosures of which are incorporated herein by reference.

FIELD

The present disclosure relates to optical imaging devices, and in particular to devices capable of splitting a single optical image into further images.

BACKGROUND

Within complex optical systems, optical imaging devices are used for manipulation of an optical image. The Applicant's Patent GB 2442576 discloses an optical imaging device for splitting an initial image into three images along a single axis, so that the three images are formed side by side and can be viewed simultaneously to give information about a sample being examined using microscopy-related equipment. GB 2442576 further discloses how auxiliary lenses can be disposed in the optical pathways of image splitting devices at specific locations such that images are in focus at different depths with respect to the original image, but are all of the identical magnification.

It is the aim of the present disclosure to provide an optical imaging device capable of splitting an initial image into four or more images.

SUMMARY

Optical imaging devices for splitting an initial image into images with different optical characteristics are disclosed herein. In some examples, an optical imaging device comprises a plurality of beamsplitting elements and at least first and second reflectors that are arranged to create multiple images. The multiple images are adjustably separable in two orthogonal directions. The first reflector is rotatable about a first axis, and the second reflector is rotatable about a second axis that is orthogonal to the first axis.

DESCRIPTION

Figure 1:
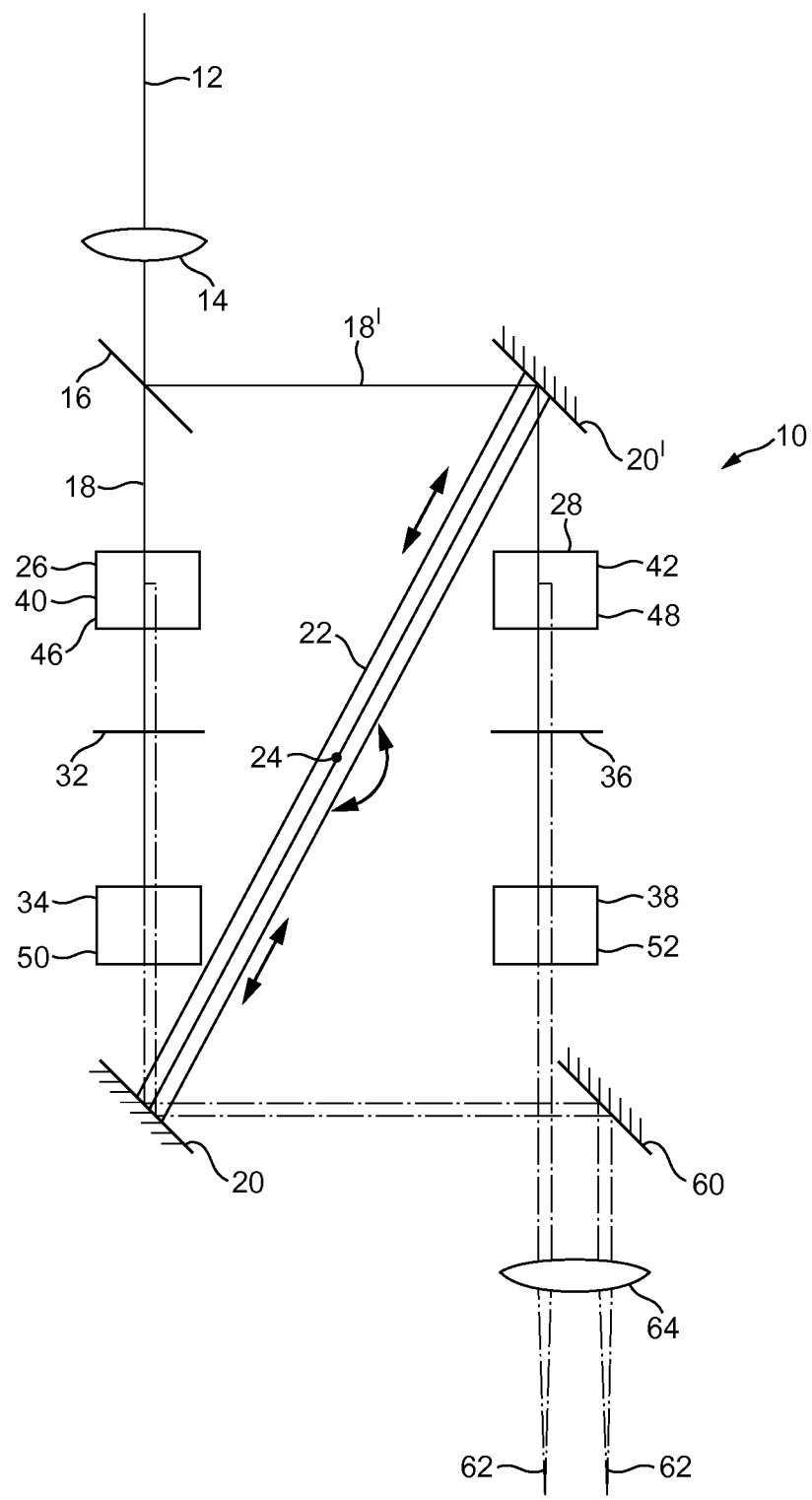
FIG. 1 is a schematic diagram of an optical imaging device in accordance with the present disclosure in plan view.

In accordance with one aspect of the disclosure, there is provided an optical imaging device for splitting an initial image into images with different optical characteristics, wherein the device comprises a plurality of beamsplitting elements or beamsplitters, and at least first and second reflectors arranged to create multiple images adjustably separable in two orthogonal directions wherein the first reflector is rotatable about a first axis and the second reflector is rotatable about a second axis, the second axis orthogonally disposed to the first axis. Thus where four images are produced, they will be formed as four separate, non-overlapping images in four quadrants having a common origin, with a first image at position (X1, Y1), a second image at (X1, Y2), a third image at (X2, Y1) and a fourth image at (X2, Y2). By rotating the first and second reflectors about respective axes that are orthogonal to each other, horizontal and vertical separation of the multiple images is adjustable.

The beamsplitting elements are preferably located in a first optical layer to create multiple optical pathways directed substantially orthogonally from the first optical layer to a second spaced apart optical layer, each optical pathway representing an image with defined optical characteristics and being focussed within the second optical layer to create multiple images with different optical characteristics which are spaced in orthogonal directions. Typically four such images will be produced.

Typically the optical pathways will be directed by the beamsplitting elements and at least two reflectors within the first optical layer.

Each reflector may be moveable translationally relative to its rotational axis, thereby to adjust the distance of the reflector from the axis of rotation.

Each reflector may further comprise a pair of reflective elements, the reflective elements within each pair disposed either side of an axis of rotation. Thus the first reflector comprises a first pair of reflective elements and the second reflector comprises a second pair of reflective elements, the first pair of reflective elements rotatable about a first axis and the second pair of reflective elements rotatable about a second axis orthogonal to the first axis with the device creating multiple images separated along, typically, horizontal and vertical axes.

If desired, at least one reflective element may be moveable laterally with respect to its rotational axis, remaining substantially the same distance from its rotational axis. This allows for optimization of beam paths.

Each reflective element may be a single mirror or equivalent reflecting component. However two smaller mirrors may be used to replace a larger mirror and so each reflective element may further comprise a plurality of reflective components, such as mirrors.

The position of the reflective elements of the first and/or second pairs of reflective elements may be independently variable with respect to their axis of rotation. This allows one reflective element to be adjusted to be closer to the axis of rotation than the other reflective element in the pair.

The reflective elements of the first and/or second pairs of reflective elements may be maintained at a fixed separation with their position relative to their axis of rotation being adjustable.

The position of the reflective elements of either the first or second pairs of reflective elements may be independently variable with respect to their axis of rotation whilst the reflective elements of the other pair of reflective elements are maintained at a fixed separation with their position relative to their axis of rotation being adjustable.

Thus for one pair of reflective elements, the separation of the reflective elements can be altered with respect to each other and also with respect to their axis of rotation, in the other pair the separation between reflective elements within the pair remains the same but their position with respect to the axis of rotation can be changed. Preferably one pair of reflective elements carried on a first rotatable carriage and the other pair of reflective elements carried on a second rotatable carriage, or first and second arms, to allow for ease of adjustment.

The first and second carriages are preferably nested within each other so as to be moveable within substantially the same volume. This avoids positioning the arms sequentially, one after the other, which would lead to unduly long optical pathways and increased aberrations.

The device may further comprise optical elements for modifying the characteristics of the optical pathways. The adjustable rotations of the two rotating carriages allow the separation of individual images to be varied along both the horizontal and vertical axes, and the variable displacement of the reflective elements from their axes of rotation allow the overall beam diameters within the device to be minimised according to whatever the characteristics of the previous optics may be, in order to minimise any optical aberrations introduced by the device.

Thus there is provided an optical imaging device for splitting an initial image into images with different optical characteristics, wherein the device has a first optical layer spaced apart from a second optical layer and a deflector associated with the first optical layer, the first optical layer creating a plurality of optical pathways deflectable by the deflector to the upper optical layer for output as separate images spaced apart in orthogonal directions. Typically the first and second layers will be vertically spaced apart.

Figure 2:
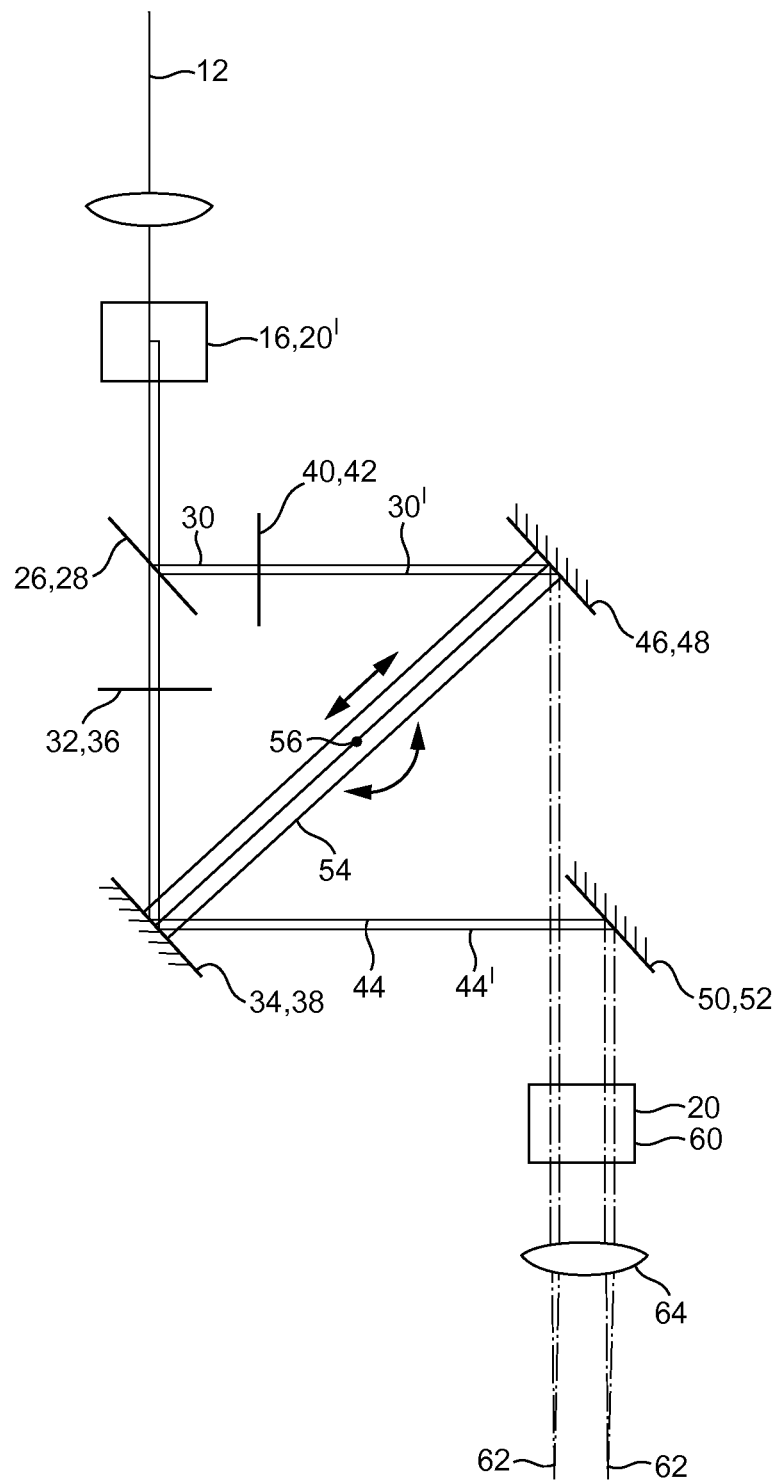
FIG. 2 is schematic side view of FIG. 1.
Figure 3:
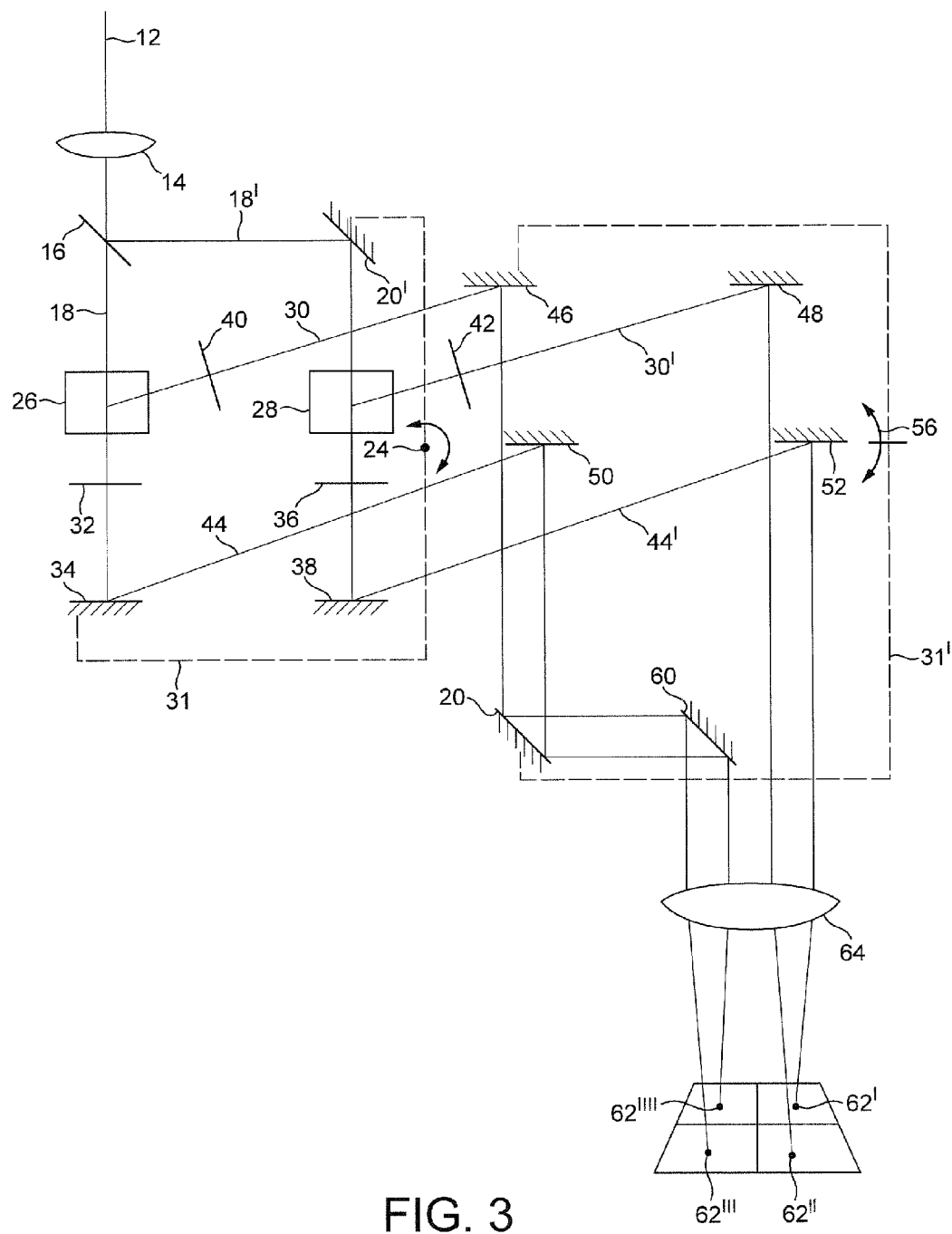
FIG. 3 is an exploded view of the optical imaging device to illustrate three-dimensional optical pathways.

FIG. 1 shows a plan view of an optical imaging device 10 or image splitter according to the disclosure. Optical pathways in this device are extended into the third dimension, out of the plane of the drawing as can be seen in FIG. 3 where diagonal lines 30, 30', 44, 44' represent vertically oriented light beams, such that the left-hand half of FIG. 3 represents a lower horizontal plane 31 and the right-hand half of the figure represents a vertically displaced, or higher, optical plane 31', the two optical planes being spaced apart vertically and overlapping horizontally. Due to the overlying nature of the two optical planes, certain items within the figures are shown with more than one reference numeral to indicate where components overlie each other and as can be seen from the exploded view in FIG. 3. In FIGS. 1 and 2, light paths at the higher optical plane are shown with a dashed and dotted line -.- and where necessary for clarity light paths are shown slightly displaced from their true path.

In image splitter 10, light from a prior image 12, such as obtained from a microscope imaging system, is collimated by lens 14, and beamsplitter 16, such as a dichroic mirror or a polarizer, divides this light into two essentially equal optical pathways 18, 18'. Reflected pathway 18' is reflected by a further 90 degrees by mirror 20' mounted on a rotating cradle 22, rotatable about vertical axis 24, see FIG. 2, with mirror 20' being moveable along cradle 22 to vary the distance from mirror 20' to the axis of rotation.

The reflected and direct pathways 18, 18' are incident on beamsplitter cubes 26 and 28 oriented such that the reflected beams emerge upwards from the plane of FIG. 1, represented by the diagonally drawn beam pathways 30, 30' in FIG. 3. The orientation of all three beamsplitters 16, 26 and 28 with respect to a precise 90 degree deviation for the reflected beams is independently adjustable.

Where images focused at different depths into a new sample are required, converging lens 32 is interposed in pathway 18 between beamsplitter 26 and mirror 34 and similarly diverging lens 36 is interposed in pathway 18' between beamsplitter 28 and mirror 38. Lenses 32 and 36 change the positions of best focus in the optical pathways 18 and 18'. Corresponding changes can also be provided in vertical pathways 30, 30' with appropriate converging and diverging lenses 40, 42 disposed in vertical pathways 30, 30' respectively. The locations of lenses 32, 36, 40 42 are chosen such that the optical distance from the collimating lens 14 is the same for all four lens locations. The locations are variable, subject to keeping the distance between the collimating lens and each lens location the same, so as to allow a distance to be found such that the placing of converging or diverging lenses at any of these locations changes the focus depth with respect to the original image, but without changing the overall magnification. This distance will be dependent on the properties of the preceding optics. In practice, this is most easily accomplished by changing the position of collimating lens 14 with respect to the rest of the optical pathway, as its separation from the mirrors and the refocusing lens 64 is not critical. Whilst reference has been made to a combination of converging and diverging lenses, if desired only converging or only diverging lenses may be used.

Mirrors 34 and 38 reflect the transmitted beams from beamsplitters 26 and 28 in a vertical direction along vertically oriented pathways 44, 44'.

Vertically oriented pathways 30, 30', 44, 44' are respectively incident on mirrors 46, 48, 50 and 52. Mirrors 46 and 48 reflect vertical beams 30, 30' from beamsplitters 26 and 28 in a horizontal direction to form part of a new upper horizontal beam level, similarly vertical beams 44, 44' are reflected by mirrors 50, 52, to bring them to the upper horizontal beam level.

Mirrors 46 and 48 are located as a pair at one end of a rotating cradle 54 oriented such that the axis of rotation 56 is in the left-right direction of the FIG. 3, with mirrors 34, 38 located as a second pair at the other end of the cradle, see FIG. 2. The mirror pairs can be replaced by a single larger mirror if desired, then providing a single mirror on either end of rotating cradle 54.

Mirrors 50 and 52 are of a size and position such that they can reflect all the light in this optical pathway, while not obstructing any of the reflected light from mirrors 46 and 48. This condition can be optimised by sliding cradle 54 holding mirrors 46, 48, 34 and 38 with respect to its axis of rotation, so that the centre of the cradle 54 is no longer directly above axis 56 although the mirrors are maintained at a fixed distance with respect to each other. For clarity, the optical pathways from mirrors 50 and 52 are shown slightly displaced to the right compared with those from mirrors 46 and 48, whereas in fact they are in the same horizontal position, but in a slightly higher vertical position.

The beam pathways reflected from mirrors 46 and 50 are now reflected by mirror 20. Mirror 20 is positioned at the opposite end of rotating cradle 22 to mirror 20', with mirror 20 at the upper horizontal beam level rather than the lower one. The two rotating cradles 22, 54 are arranged one within the other, rather than sequentially, so as to rotate within substantially the same volume. Furthermore, although cradle 22 ensures that mirrors 20, 20' rotate by the same angle, the larger separation between mirrors 20 and 20' on the outer of the two nested rotating cradles, compared with that between mirrors 46, 48 and 34, 38 on the inner cradle 54 makes it desirable for the distances of mirrors 20, 20' from the axis of rotation to be made independently adjustable in order to optimally align the overall beam pathways within the device, and to minimise optical aberrations by minimising the composite beam diameter at the location of the refocussing optics. This allows the optical performance to be optimised as the image separation is varied by rotation of cradles 22 and 54. It is worthwhile to provide these adjustments, as the beam pathways within the device depend to some extent on the characteristics of the preceding optics that produced the original image, and these cannot necessarily be known in advance.

Rotation of cradle 22 varies the horizontal separation of the images, whereas rotation of cradle 54 holding mirrors 46, 48, 34 and 38 varies the vertical separation of the images. This allows the four images to be arranged as the four quadrants of a final composite image, so that all four images can have the same aspect ratio. As both the horizontal and vertical separation of the images can be varied by rotating the cradles, the separation of the four images can be adjusted dependent on the final imaging device on which they are focussed. Such devices come in a variety of sizes and the larger the final imaging device or sensor, the greater the desired separation between the images.

Finally, the beam reflected by mirror 20 is reflected again by mirror 60, so that all four beams are now travelling in the same direction as the input beam from image 12, albeit displaced both horizontally and vertically with respect to it. The four beams are each then focussed to form an image 62 by a single lens 64, see FIG. 3 where the four separate images 62', 62", 62''' and 62'''' are shown displaced from each other along horizontal and vertical axes. Typically these four simultaneously acquired images with different optical characteristics are brought to a common focus and imaged onto a final imaging device, such as a camera chip or other image capturing hardware.

In FIG. 1, the focussed output is shown exiting in the same direction as the input. However, in practice it is likely to be desirable to have the output emerge at 90 degrees to the input. This choice in no way affects the fundamental operation of the splitter but if selected would involve altering the position of the mirror 60 so that beam pathways from mirror 20 travel direct to lens 64, repositioned and reoriented at 90 degrees to the input, with mirror 60 now oriented to deflect beam pathways from mirror 20' towards lens 64.

Figure 4:
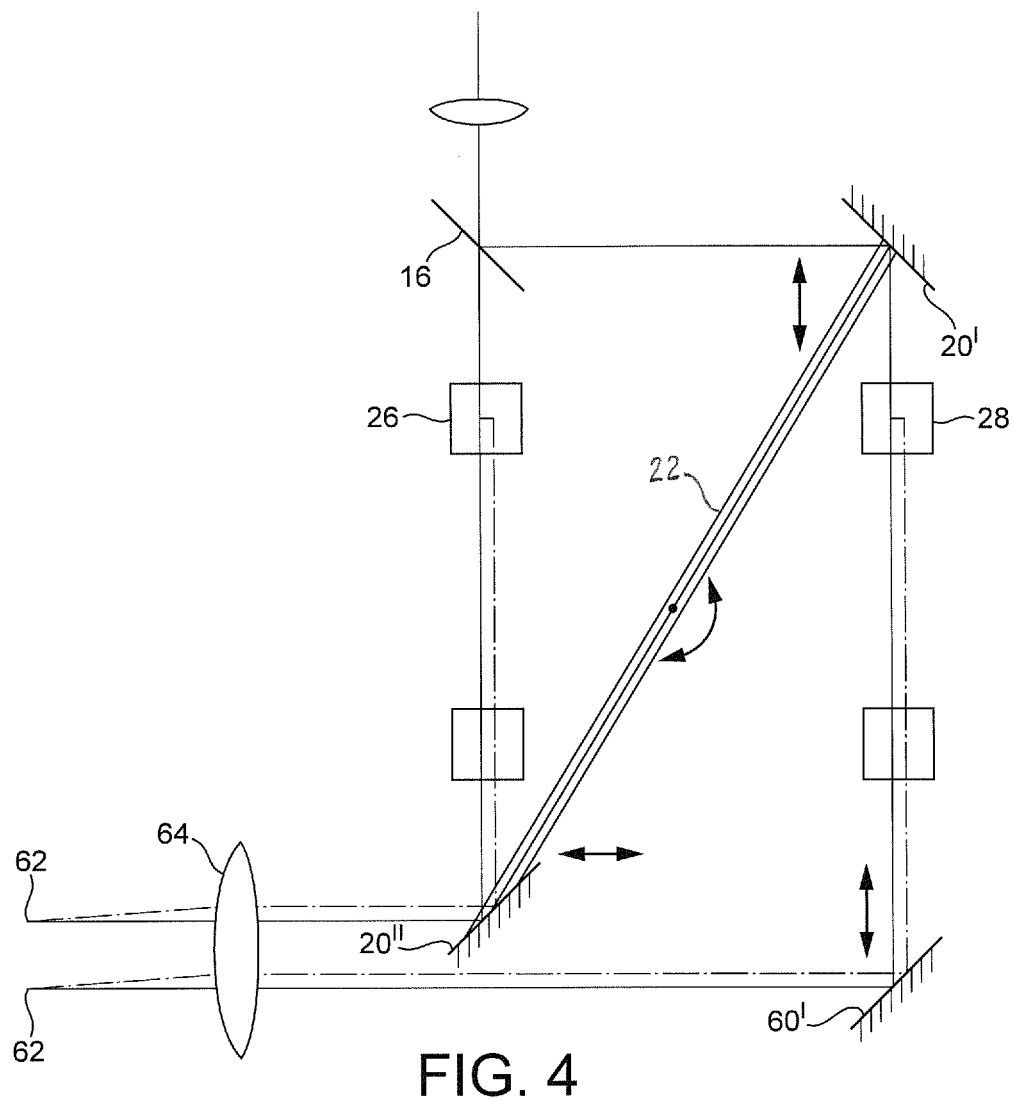
FIG. 4 is an alternative embodiment of the disclosure.

Although the embodiment shown in FIG. 1, or its alternative in which mirror 60 has been reorientated so that the output is now directed to the right rather than downwards, is to be preferred for reasons of optical symmetry, there are practical issues that may make the further embodiment shown in FIG. 4 more convenient in practice. In this embodiment, the output is now directed towards the left, in order to make it on the same side as an access hatch for first beamsplitter cube 16.

The reason for this is that in use the beamsplitter cubes are likely to be interchanged on a fairly regular basis, so convenient access to them is an important practical issue. This further embodiment allows the unit to be orientated so that both the camera output at image position 62 and first beamsplitter cube 16 are readily accessible. Typically the orientation in use will be such that both are facing upwards, in order to allow convenient access to the other two beamsplitter cubes 26 and 28 from one side, rather than from below. In this orientation, access to two of the four auxiliary lenses 32, 36, 40, 42 will now be from below, which is less convenient, but in practice these components won't generally need to be interchanged on a regular basis.

In this alternative embodiment, mirror 20" on the rotating horizontal arm is now a half-length mirror, being half the length of mirror 20'. Ideally the near edge of mirror 20" (with respect to the beam direction) should always coincide with the optical axis (i.e. the midline) of output focussing lens 64, so there is no longer any merit in being able to slide it along horizontal arm 22, although mirror 20" must still be rotatable about an axis. Instead, the preferred method of optimising the beam position of this reflected pathway with respect to output focussing lens 64 is for mirror 20" to be moveable sideways with respect to horizontal arm 22, with its distance from the pivot point of arm 22 remaining constant. This sideways movement will allow the reflected beam position from half-length mirror 20" at lens 64 to be optimised so that the reflected beam position is as close as possible to the optical axis of lens 64, while still being fully reflected by half-length mirror 20".

Similarly, it is now desirable for the position of mirror 60', which can now be a full-length mirror, to be adjustable as well, while remaining at the same fixed angle. This will allow the position of the beam reflected by mirror 60' to be similarly optimised at output focussing lens 64, so that the beam is as close as possible to the optical axis of lens 64, while remaining unobstructed by half-length mirror 20". The adjustment direction of mirror 60' needs to have a component perpendicular to the mirror surface, so could be achievable in a variety of ways, but the preferred direction would be parallel to the position of horizontal arm 22.

Thus in the embodiments described, each of the two initial optical pathways from a first splitter element 16 leads to an independent second splitter element 26, 28 giving a total of four output beams spaced apart in two orthogonal directions and each beam having independently selectable optical characteristics. The optical path length of each of these four output beams is identical, so it is possible to introduce corrector lenses in every pathway at the correct location to focus at different depths in the original image at the same magnification. In addition, or alternatively, to the capability to focus at different depths, beam splitters 26, 28 can be selected to perform chromatic or other separation, such as by polarization, of the images. The two rotating cradles 22, 54 oriented at 90 degrees with respect to each other separate the images first along one axis and then along an orthogonal axis which means that the total length of the infinity space between the collimating and refocussing optics necessarily has to be increased. However, the extent of the increase is minimised by "nesting" the two cradles 22, 54 within each other, rather than making them fully sequential.

The greater complexity of the optical pathway compared with the prior art means that optimal alignment for precise image location and minimum aberrations is both more important and more complicated. In order to reduce the chances of the user inadvertently misaligning the device, it can be desirable to reduce the number of alignment controls for the splitters, lenses and cradles. The most likely reason for any adjustment to be necessary is when any of the beamsplitter cubes 16, 26, 28 are replaced, as their orientation may then be slightly changed. Therefore, in the current design, fine alignment controls are available to the user for all the beamsplitter cubes, so that any errors can be corrected at source, rather than some compensatory adjustments needing to be made elsewhere in the device. A further improvement in the present disclosure is that the optimum distance between the input collimating lens and the corrector lenses also depends to some extent on the characteristics of the preceding optics, so the location of the input lens within the device can now be varied in order to take this into account.

The invention claimed is:

1. An optical imaging device for splitting an initial image into images with different optical characteristics, wherein the device comprises a plurality of beamsplitting elements and at least first and second reflectors arranged to create multiple images adjustably separable in two orthogonal directions, wherein the first reflector is rotatable about a first axis and the second reflector is rotatable about a second axis, the second axis orthogonal to the first axis.

2. An optical imaging device according to claim 1, wherein the beamsplitting elements are located in a first optical layer to create multiple optical pathways directed substantially orthogonally from the first optical layer to a second spaced apart optical layer.

3. An optical imaging device according to claim 1, wherein each reflector is moveable translationally relative to its rotational axis.

4. An optical imaging device according to claim 1, wherein each reflector further comprises a pair of reflective elements, the reflective elements within each pair disposed either side of an axis of rotation.

5. An optical imaging device according to claim 4, wherein the reflective elements further comprise a plurality of reflective components.

6. An optical imaging device according to claim 4, wherein the position of the reflective elements is independently variable with respect to their axis of rotation.

7. An optical imaging device according to claim 4, wherein the reflective elements of a pair of reflective elements are maintained at a fixed separation with their position relative to their axis of rotation being adjustable.

8. An optical imaging device according to claim 4, wherein the position of the reflective elements of one pair of reflective elements is independently variable with respect to their axis of rotation and the reflective elements of the other pair of reflective elements are maintained at a fixed separation with their position relative to their axis of rotation being adjustable.

9. An optical imaging device according to claim 4, wherein at least one reflective element is moveable laterally with respect to its rotational axis, remaining substantially the same distance from its rotational axis.

10. An optical imaging device according to claim 9, wherein the position of the reflective elements of one pair of reflective elements is independently variable with respect to their axis of rotation and the reflective elements of the other pair of reflective elements are maintained at a fixed separation with their position relative to their axis of rotation being adjustable.

11. An optical imaging device according to claim 4, wherein one pair of reflective elements is carried on a first rotatable carriage and the other pair of reflective elements is carried on a second rotatable carriage, the two carriages independently rotatable about respective orthogonal axes.

12. An optical imaging device according to claim 11, wherein the first and second carriages are nested within each other so as to be moveable within substantially the same volume.

13. An optical imaging device according to claim 1, further comprising optical elements capable of modifying characteristics of optical pathways.

14. An optical imaging device for splitting an initial image into images with different optical characteristics, the device comprising:
   a plurality of beamsplitting elements located in a first optical layer to create multiple optical pathways directed substantially orthogonally from the first optical layer to a second spaced apart optical layer;
   at least first and second reflectors arranged to create multiple images adjustably separable in two orthogonal directions, wherein the first reflector is rotatable about a first axis and the second reflector is rotatable about a second axis, the second axis orthogonal to the first axis, wherein each reflector is moveable translationally relative to its rotational axis, and wherein each reflector comprises:
      a pair of reflective elements, the reflective elements within each pair disposed either side of an axis of rotation, wherein the position of the reflective elements is independently variable with respect to their axis of rotation;
   first and second rotatable carriages, wherein the reflective elements of the first reflector are carried on the first rotatable carriage, and wherein the reflective elements of the second reflector are carried on the second rotatable carriage, wherein the first and second rotatable carriages are independently rotatable about respective orthogonal axes.

15. An optical imaging device according to claim 14, wherein the first and second carriages are nested within each other so as to be moveable within substantially the same volume.

* * * * *